Figure 1:
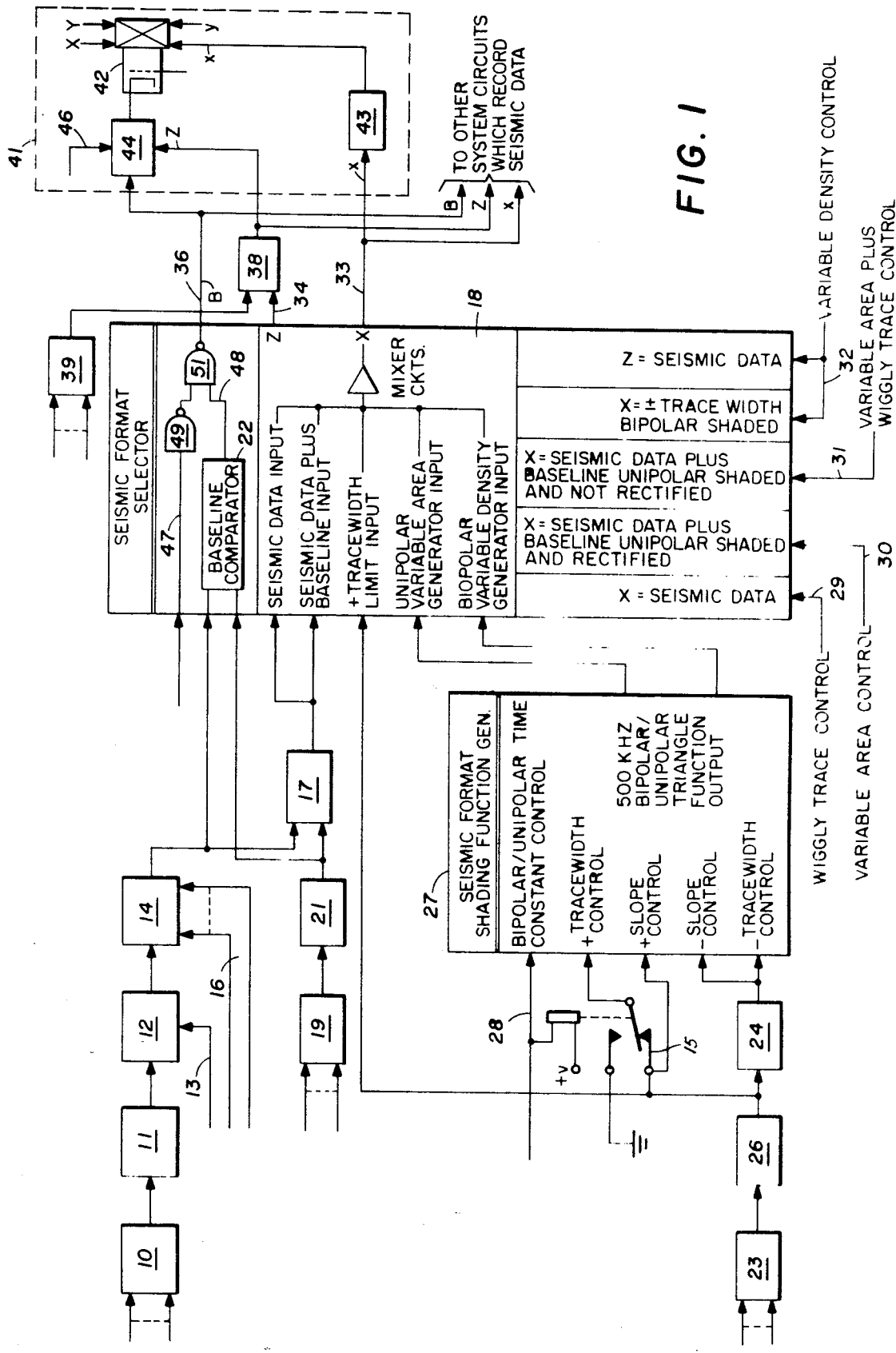

United States Patent

[11] 3,603,963

| [72] | Inventor | Phillip W. Ward<br>Arlington, Mass. |
|---|---|---|
| [21] | Appl. No. | 694,691 |
| [22] | Filed | Dec. 29, 1967 |
| [45] | Patented | Sept. 7, 1971 |
| [73] | Assignee | Texas Instruments Incorporated<br>Dallas, Tex. |

[54] SEISMIC FORMAT GENERATOR
3 Claims, 8 Drawing Figs.

[52] U.S. Cl. .................................................... 340/324 A,
315/22, 340/15.5 FC
[51] Int. Cl. ............................................................ G06f 3/14
[50] Field of Search ............................................ 340/324 A,
15.5 FC, 15.5 DS; 235/150.53, 150.5, 198; 343/7
TA; 315/22

[56] References Cited
UNITED STATES PATENTS

| 3,343,030 | 9/1967 | Dragon et al. | 340/324.1 |
| 3,406,387 | 10/1968 | Werme | 340/324.1 |
| 3,474,438 | 10/1969 | Lauher | 340/324.1 |
| 3,213,447 | 10/1965 | Burrows et al. | 343/7 |
| 3,440,480 | 4/1969 | Henderson | 340/324.1 |

Primary Examiner—John W. Caldwell
Assistant Examiner—Marshall M. Curtis
Attorneys—Samuel M. Mims, Jr., James O. Dixon, Andrew M. Hassell, Harold Levine, Rene' E. Grossman, John E. Vandigriff and Richards, Harris & Hubbard ABSTRACT: A seismic format generator for transforming an analog seismic signal into either a wiggle trace format, a variable area format, variable area plus wiggle trace, or variable density format. A shading function generator supplies a unipolar and bipolar shading function to a format selector for the variable area and variable density formats. Input instructions to the format selector determine the selective combination of various input signals to produce a desired seismic format. The seismic format is displayed on a cathode-ray tube which also receives a display blanking signal and an intensity modulating signal from the format selector.

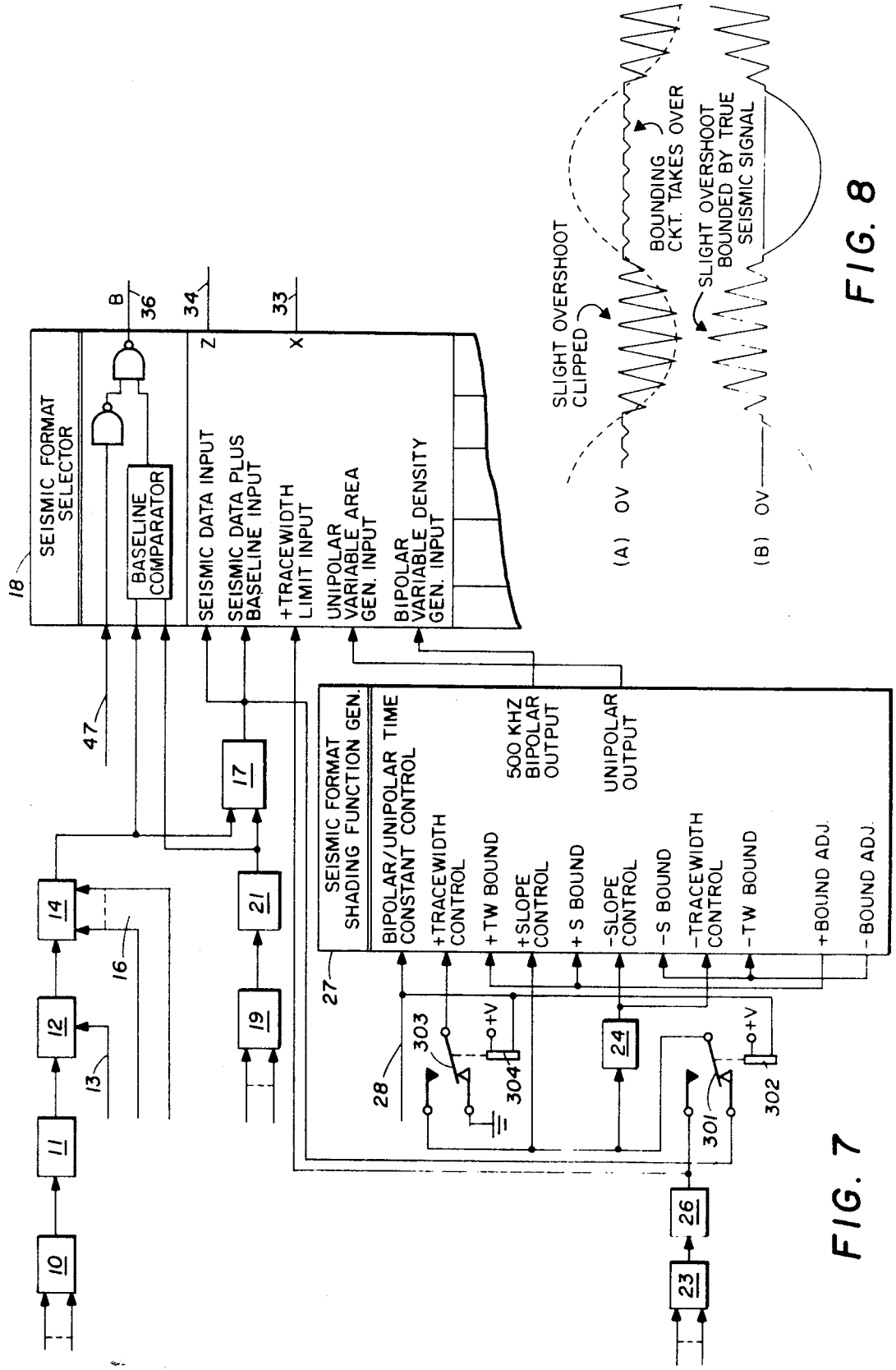

3,603,963

SEISMIC FORMAT GENERATOR

This invention relates to a seismic data processing system and more particularly to a seismic format generator for selectively combining analog seismic data with characterizing voltages to produce a desired seismic format.

In the general method of seismic exploration, elastic waves are created at or adjacent to the surface of the earth by generating a disturbance such as by the explosion of dynamite. Seismic waves thus generated are transmitted downwardly through the earth and reflected back to the earth surface from the interfaces between subsurface strata due to discontinuities or variations in the elastic wave transmitting properties of such strata. A plurality of seismic transducers arranged at spaced distances from the disturbance point detect the arrival of the reflected waves at the surface of the earth. These seismic transducers convert the detected waves to equivalent electrical signals which are then amplified and recorded in a form known as a seismogram or a seismic record. The seismic record consists of a plurality of traces arranged in parallel relation each representative of the output of an individual seismic transducer. Before a useful analog of the subsurface strata can be mapped, extensive processing of raw data must be performed.

With the advent of the digital computer for data processing, it was natural that such a computer be used to process the many electrical signals available in seismic exploration. In digital computer processing, the received seismic signals are converted from analog to digital form and subsequently recorded. Eventually, the processed digital data must be converted back to an analog signal by a digital-to-analog converter for meaningful interpretation. These analog signals in turn must be appropriately modified by a format generator into a form which, when displayed or printed, aids the interpretation thereof by a geophysicist. In such systems, the advantages of digital data processing and analog modeling can both be realized. This invention provides a generator for operation between a digital seismic data processing system and an analog reproduction system where seismic data is to be formated sequentially one trace at a time.

In addition to increasing the ease with which large amounts of data can be processed, the digital computer also provides a means for presenting each electrical signal received from a seismic transducer in its most meaningful form. This is accomplished by a plurality of instructions for each of the electrical signals processed by the computer. In accordance with the present invention, digital seismic data from a computer is converted into an analog form and modified to a desired format by means of a format generator operating in accordance with one of a plurality of input instructions. A typical example of a digital processing and analog display system is described in the U.S. Pat. No. 3,525,092 of Edwin B. Neitzel, Ser. No. 606,281, filed Dec. 30, 1966, issued Aug. 18, 1970 and assigned to the assignee of the present invention. The system described therein is a multimode recording system under digital computer control where a cathode ray tube has an input channel for recording successive seismic traces with means for writing such traces side-by-side sequentially while operating in a first mode. In a second mode of operation annotation signals are applied to the display.

In accordance with the present invention, a seismic format generator is provided for a seismic data processing system wherein analog seismic data is selectively combined with a baseline voltage, a tracewidth voltage, a unipolar shading function, and a bipolar shading function in accordance with a plurality of input instructions to generate a desired format for visual display. The seismic format generator includes a shading function generator and a format selector having a mixer circuit for combining the analog seismic data with said other voltages and a switching arrangement responsive to the plurality of input instructions for selectively connecting the seismic data with said other voltages to the mixer.

A more complete understanding of the invention and its advantages will be apparent from the specification and claims and from the accompanying drawings illustrative of the invention.

Figure 2:
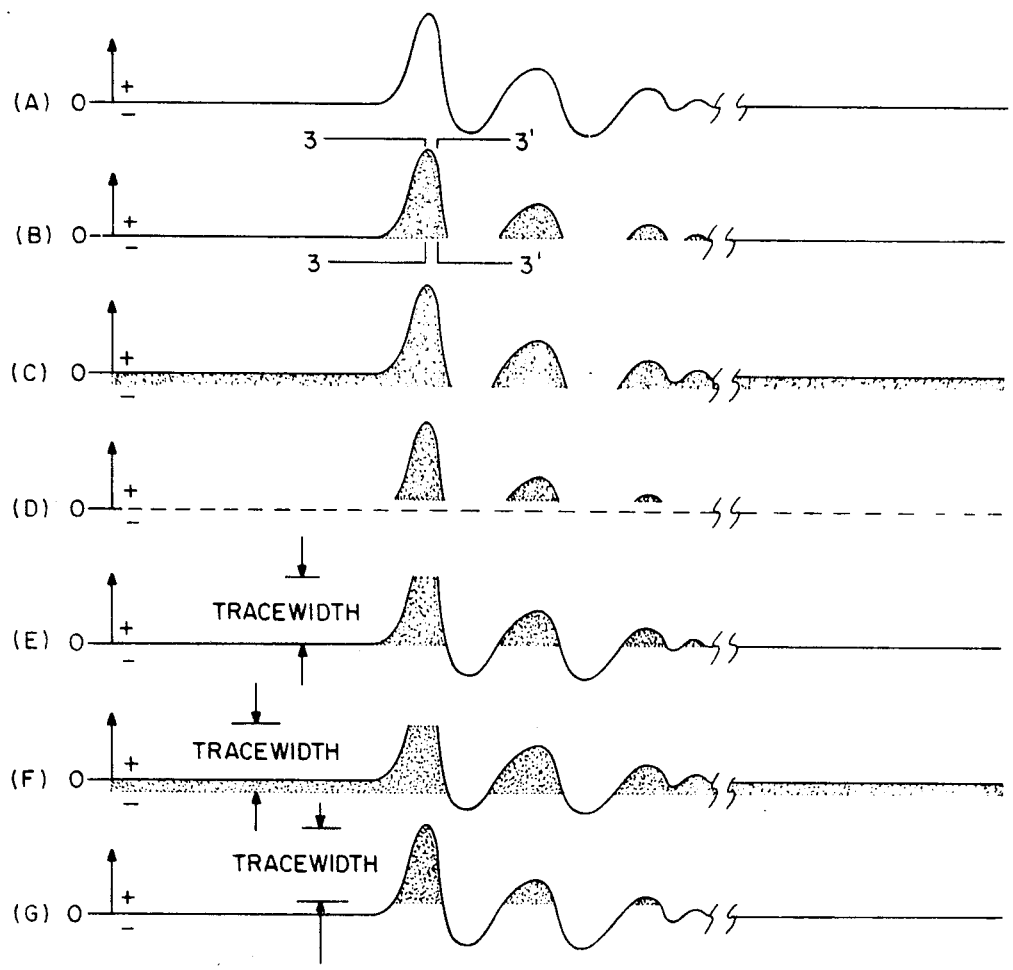
Figure 3:
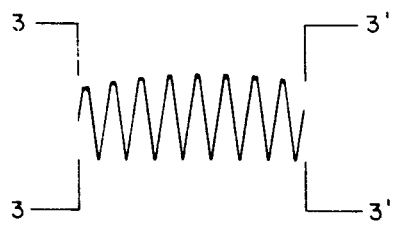
Figure 5:
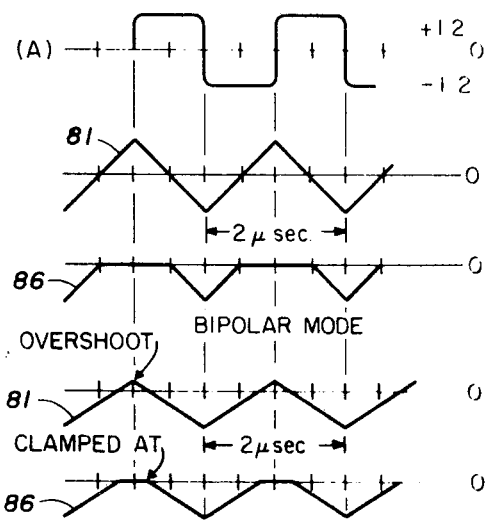
Figure 4:
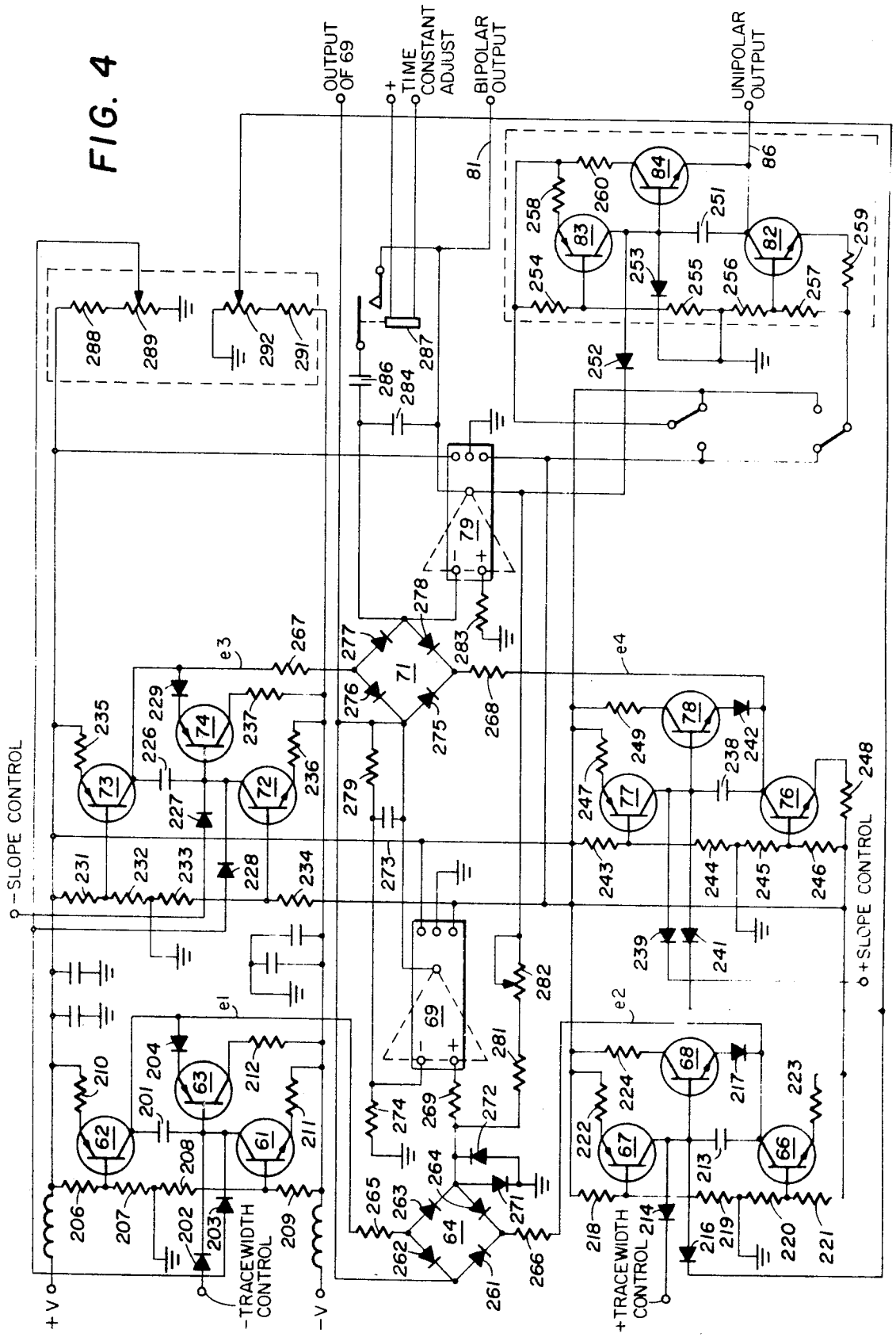
Figure 6:
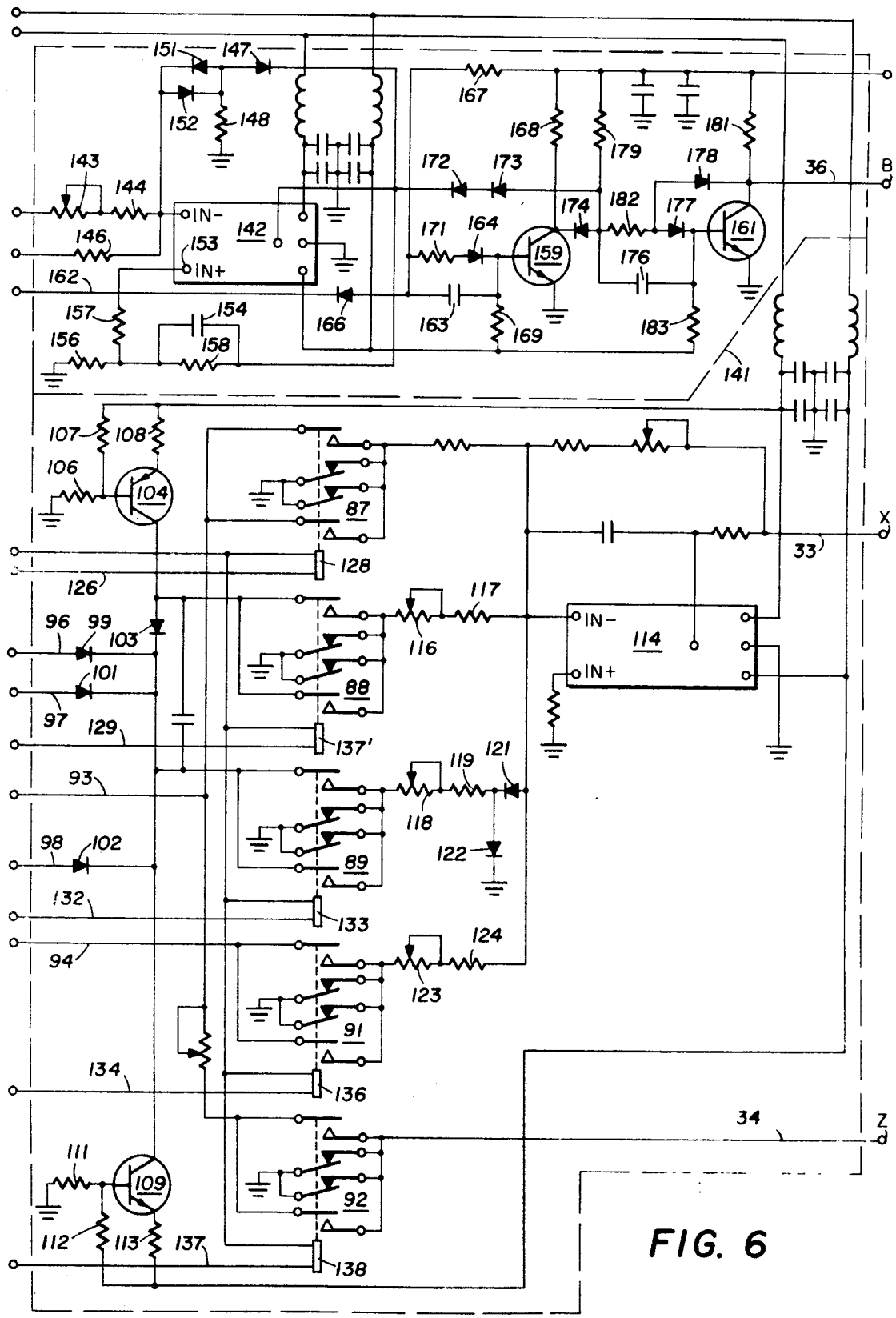

Referring to the drawings:

FIG. 1 is a block diagram of a seismic format generator for characterizing seismic data converted from digital to analog form to be recorded on a cathode ray tube, FIG. 2 illustrates several of the seismic formats generated by the system of FIG. 1, FIG. 3 is an exploded view of the curve at line B of FIG. 2 between the lines 3—3', FIG. 4 is an electrical schematic of the shading function generator of FIG. 1, FIG. 5 illustrates the unipolar and bipolar triangular wave output of the shading function generator of FIG. 4, FIG. 6 is an electrical schematic of a format selector of the system of FIG. 1, FIG. 7 is a block diagram of an alternate embodiment of a seismic format generator, and FIG. 8 illustrates the shading function produced by the system of FIG. 7 and a variable area format.

Referring to FIG. 1, there is shown a seismic recording system wherein digital seismic data from a computer (not shown) is converted into an analog equivalent in a digital-to-analog converter 10. A low-pass filter 11 couples the output of the converter 10 to an impedance matching amplifier 12. An instruction code connected to the impedance matching amplifier 12 on an input line 13 determines whether the polarity of the analog signal is transmitted as received or inverted. An attenuation amplifier 14 modifies the output of the impedance matching amplifier 12 in accordance with an attenuation code on input lines 16. From the attenuation amplifier 14 the analog seismic data is transmitted to a summing amplifier 17 wherein a summation with a baseline voltage is performed, assuming a baseline voltage exists. Without a baseline voltage the amplifier 17 becomes simply a unity gain inverting amplifier having an output voltage connected to two input channels of a seismic format selector 18.

A digital variable-area baseline voltage from a data processing system (not shown) is converted into an analog equivalent in a digital-to-analog converter 19 and transmitted to the summing amplifier 17 through an impedance matching amplifier 21. The analog baseline voltage from the impedance amplifier 21 is also compared with the analog seismic data from the attenuation amplifier 14 in a baseline comparator 22 as part of the seismic format selector 18.

A digital tracewidth and slope control signal from the data processing system is converted into an analog voltage equivalent in a digital-to-analog converter 23 and transmitted to an inverter amplifier 24 through an impedance matching amplifier 26. The output of the impedance matching amplifier 26 is tied to the plus tracewidth channel by means of a relay 15, the plus slope control channel of a shading function generator 27, and a tracewidth channel of the seismic format selector 18. An output voltage of the inverting amplifier 24 is transmitted to a minus tracewidth channel and a minus slope control channel of the shading function generator 27. The shading function generator 27 produces a bipolar or unipolar triangular wave voltage, typically at about 500 kHz. which are two control voltages connected to the seismic format selector 18. An instruction code from the digital computer on an input line 28 determines whether the shading function output is bipolar or unipolar. With a logic ONE code on line 28, the relay 15 is in the bipolar mode, as shown.

In addition to the analog format control voltages and the seismic data, the seismic format selector 18 receives digital input instructions on lines 29 through 32. The format selector 18 generates three output voltages each independent of the others, a seismic format trace voltage on line 33, an intensity control voltage appears on line 34 in the variable density mode, and a blanking signal appears on line 36 in the variable area mode. A summing amplifier 38 adds the intensity control voltage (if any) on line 34 to a master intensity control voltage. A digital-to-analog converter 39 converts a digital master intensity signal from the data processing system into an equivalent analog voltage connected to the amplifier 38.

All three outputs of the format selector 18 are transmitted to a high resolution cathode ray tube station 41 and to other similar display stations not shown. Specifically, the seismic format trace voltage on line 33 connects to the x-deflection yokes of a cathode ray tube 42 through a deflection amplifier 43. An intensity control voltage from the amplifier 38 and the blanking signal on line 36 are coupled to a blanking and intensity linearization amplifier 44. This amplifier supplies a driving voltage to the electron gun of the CRT 42.

The function of the seismic format generator is to produce one of several standard seismic formats in accordance with instructions from a master controller as transmitted on lines 29 through 32. For the seismic format selector shown these formats include: a wiggley trace, a variable area, a variable area plus wiggley trace, and a variable density. Other formats may be implemented by combining one or more instructions on the lines 29 through 32. However, for purposes of understanding this invention only the four above-mentioned formats will be discussed extensively. The wiggley trace format is the simplest of all modes since it is merely the analog of the seismic data unaltered in presentation at the CRT station 41. In the wiggley trace mode, as in all other formats, an initialization program is transmitted to various components of the system from the data processing computer. For example, an address to the inverting amplifier 12 determines the polarity of the transmitted signal and an address to the attenuation amplifier 14 determines the magnitude of the transmitted signal. In the wiggley trace format, a baseline voltage is not gated to the amplifier 17 and a tracewidth voltage is not applied to the digital-to-analog converter 23. However, an intensity control signal is supplied to the digital-to-analog converter 39. The wiggley trace mode initialization program produces an instruction code on the control line 29 (which selects this format in the seismic format selector 18), while all other format selector lines 30 through 32 are deenergized.

Other initialization parameters supplied by the data processing computer include the Y sweep rate and the initial X and Y starting positions on the cathode ray tube 42. When the entire system has been programmed, a display signal appears on line 46 and a continuous seismic data digital-to-analog conversion and recording begins. A wiggley trace seismic format deflection voltage appears on line 33 which is distributed to the various cathode ray tubes, such as the CRT 42.

When the CRT 42 is unblanked (turned on), the display intensity is determined by the analog voltage at the "Z" input of the amplifier 44. This voltage is a linear function of the output of the digital-to-analog converter 39 and, in some cases, a linear function of the algebraic sum of the converter 39 output and the seismic data voltage, as will be explained. As previously implied, the output of the digital-to-analog converter 39 is determined during the initialization procedure. For fast recordings, the intensity level is set high and for slow recordings relatively low. This is a discrete level that remains fixed during the recording of a selected format.

The wiggley trace format continues to be recorded until a blanking signal is transmitted to the amplifier 44 over the line 46. An example of a wiggley trace format is shown at A in FIG. 2. Another format can then be selected for recording.

Consider next the variable area format with an instruction code appearing on line 30. The variable area format is a shaded unipolar presentation of the positive half of the algebraic sum of the analog seismic data from the amplifier 14 and a variable area baseline voltage from the amplifier 21 appearing at the output of the inverting amplifier 17. Typical examples of the variable area format are shown at lines B, C, and D of FIG. 2. In order to produce the effect of shading on the seismic signal output of the amplifier 17, given the constraint that a single CRT beam must produce the shading effect, a unipolar triangular wave voltage having a frequency many times higher than the highest seismic frequency encountered is used to sweep the CRT electron beam back and forth within a boundary imposed by the seismic signal plus baseline voltage. As shown in FIG. 2, the shading lines must be sufficiently dense so that they cannot be resolved individually.

In the variable area format, the initialization program is nearly the same as in the wiggley trace format with the exception that a baseline blanking instruction code is connected to line 47 and a tracewidth control voltage transmitted to the digital-to-analog converter 23. The tracewidth digitaltoanalog converter 23 and the impedance matching amplifier 26 translate the tracewidth code into a unipolar voltage connected to the seismic format selector 18, and, together with its complement (inverse) from the amplifier 24, is connected to the seismic format shading generator 27. At the seismic format selector 18, the tracewidth voltage limits the maximum positive excursion of the shaded seismic signal. This feature prevents the shaded portion of any two adjacent traces from overlapping when they are separated by the tracewidth value.

At the shading function generator 27, the tracewidth voltage and its complement are connected to their respective tracewidth and slope control terminals. Note, however, that in this mode the plus tracewidth control input is grounded through the contacts of relay 15 to insure that the required positive unipolar signal will be produced. A unipolar instruction code is connected to line 28 thus programming the generator to produce a precise unipolar triangular waveform whose positive amplitude equals the tracewidth voltage. The unipolar output of the shading generator 27 connects to the unipolar variable area input of the seismic format selector 18.

In the variable area mode, the seismic format selector 18 produces a unipolar shaded signal by means of an analog steering circuit which selects one of the three input voltage levels (seismic data plus baseline, tracewidth, or shading function) connected thereto. The input selected is that which produces at line 33 the most negative voltage, with the limitation that the voltage on line 33 is never less than zero. In other words, the output signal on line 33 is constrained between the limits of zero volts and the tracewidth voltage, and between these limits, the output follows the shading function so long as it is negative with respect to the analog seismic data plus baseline voltage transmitted from the summing amplifier 17. Referring to lines B, C, and D of FIG. 2, line B is a typical variable area format of the wiggley trace at line A with a zero baseline signal and the tracewidtth voltage greater than the maximum positive amplitude of the wiggley trace signal. Line C shows a typical variable area format of the wiggley trace at line A where the baseline voltage is negative and the tracewidth voltage again greater than the highest peak of the wiggley trace. Line D illustrates a variable area format where the baseline voltage is positive and the tracewidth voltage greater than the maximum positive amplitude of the wiggley trace signal.

A voltage on line 33 in the variable area format is bounded in the positive direction by the seismic data plus baseline voltage until this signal approaches zero volts. When the seismic data plus baseline level reaches zero in a negative going direction, a blanking output is produced by the baseline comparator 22 to cut off the CRT 42 display beam. Thus, only the shaded portions of the seismic data are reproduced by the CRT in the variable area mode, the unshaded portions are blanked. Only the data processing computer can supply a signal to the line 46 to turn on (unblank) the display beam of the CRT 42. However, other portions of the system may turn it off. In the variable area mode, for instance, when the baseline comparator 22 senses that the analog seismic data is more negative than the variable area baseline voltage, it generates a blanking signal on the line 36 that turns off the display beam. When the analog seismic data again becomes more positive than the baseline voltage, the comparator responds to generate an unblank signal on line 36 which again turns on the display beam of the CRT 42. In the variable area mode, a logic ZERO instruction code appears on line 47 and, by means of NAND gates 49 and 51, permits the output of the baseline comparator 22 to appear on line 36 when blanking is desired. In all other modes, the code on line 47 inhibits the comparator 22 by means of NAND gates 49 and 51.

In the variable area mode, since the shading waveform is triangular the velocity of the CRT beam is constant so long as it traverses this path. Thus, the intensity is uniform in the shaded area. When the wave generated on line 33 becomes bounded by the seismic data plus baseline voltage, the display beam assumes the velocity it would have possessed if it had been in this mode alone, thus intensifying in this condition since the velocity is slower. This condition is shown in FIG. 3 which is an expanded time scale of the portion of the variable area at line B of FIG. 2. Note the intensified boundary since the dwell time is considerable. This is a desirable result since it sets the wiggley trace portion of the display apart from the variable area portion.

The variable area plus wiggley trace format, controlled by an instruction code on line 31, requires a similar initialization program as the variable area format with the exception that a baseline blanking instruction code does not appear on line 47. Thus, a trace will appear on the CRT 42 regardless of the relationship between the seismic data and the baseline voltage. In the variable area plus wiggley trace format, the output signal at line 33 of the format selector 18 is not limited at the zero volt line. However, since the shading function is unipolar and confined between 0 volts and the plus tracewidth level, when the voltage on line 33 is negative, it is simply the wiggley trace signal alone. When positive it becomes shaded and bounded as described previously for the variable area format.

Lines E, F, and G of FIG. 2 illustrate the variable area plus wiggley trace format. Line E is a typical variable area plus wiggley trace format for the wiggley trace of line A with a zero baseline voltage less than the maximum positive amplitude and a tracewidth voltage less than the maximum positive amplitude. The illustration of line F is for a variable area plus wiggley trace format for the wiggley trace signal of line A where the baseline signal is less negative and the tracewidth voltage less than the maximum positive amplitude (with respect to a zero seismic signal level) of the wiggley trace. The variable area plus wiggley trace format shown in line G is typical for the wiggley trace of line A where the baseline voltage is positive and the tracewidth voltage greater than the maximum positive amplitude of the wiggley trace.

When an instruction code appears on line 32, the selector 18 generates a variable density format. This requires a uniform and bipolar shading function from the shading function generator 27. The initialization program for the variable density format is similar to the seismic data format with the exception that a bipolar instruction code appears on line 28 of the shading function generator 27. In this mode, the analog seismic data is not recorded directly, but appears on line 34 to produce dynamic intensity variations about the mean intensity level determined by the output of the intensity digital-to-analog converter 39. The bipolar triangular wave voltage generated by the function generator 27 appears on line 33 and is connected to the x-deflection yokes of the CRT 42. The effect is an intensity modulated bar for each seismic trace, the width of each bar being determined by the tracewidth specified.

Referring to FIG. 4, there is shown a preferred embodiment of a transistorized shading function generator 27, including a negative tracewidth input circuit consisting of transistors 61, 62 and 63, a capacitor 201, diodes 202, 203, and 204, and resistors 206-212. A negative slope control input circuit is also provided and consists of transistors 72, 73 and 74, a capacitor 226, diodes 227, 228, and 229, and resistors 231-237. Similar circuits are provided for the positive tracewidth control and positive slope control. The positive tracewidth input circuit includes transistors 66, 67 and 68, a capacitor 213, diodes 214, 216 and 217, and resistors 218-224. The positive slope control input circuit consists of transistors 76, 77 and 78, a capacitor 238, diodes 239, 241, and 242, and resistors 243-249. These positive and negative control circuits perform two functions; one, signal selection, and two, diode offset compensation to counterbalance other diodes offsets such as will be explained.

A diode bridge 64, consisting of diodes 261-264, connects to the negative tracewidth input circuit through a resistor 265 and to the positive tracewidth input circuit through a resistor 266. Similarly, a diode bridge 71, consisting of diodes 275-278, is tied to the negative slope control input circuit by means of a resistor 267 and the positive slope control input circuit by means of a resistor 268. Connected between the diode bridges 64 and 71 is an operational amplifier 69. One input terminal of the amplifier 69 connects to the diode bridge 64 through an input resistor 269 and to a clamping circuit consisting of diodes 271 and 272. The output of the amplifier 69 is tied to the diode bridge 71, the diode bridge 64, and in addition, to a feedback circuit including a capacitor 273 and resistors 274, 279. The common junction of resistors 274 and 279 connects to a second input terminal of the amplifier 69. An operational amplifier 79 connects to the common junction of diodes 277 and 278. The operational amplifier 79 has an output terminal tied to the input resistor 269 through a resistor 281 in series with a potentiometer 282. A second input terminal of the operational amplifier 79 is tied to ground through a resistor 283. The operational amplifier 79 has an integrating feedback circuit consisting of a capacitor 284. For unipolar operation, the capacitor 284 is paralleled with a capacitor 286 by means of a relay 287.

To function as signal selectors, the negative tracewidth control and negative slope control input circuits are connected to a voltage divider network of a resistor 288 in series with a potentiometer 289. The wiper arm of the potentiometer 289 is tied to the diodes 203 and 228. Similarly, the positive tracewidth control and slope control input circuits are connected to a voltage divider network including a resistor 291 in series with a potentiometer 292, also for signal selection. In particular, the wiper arm of potentiometer 292 is connected to the diodes 216 and 241. Assume that $e_1$ represents a voltage equal to the negative tracewidth voltage plus one diode offset voltage. This latter voltage tracks with temperature and compensates for the offset resulting from conduction through the diode 263. If the negative tracewidth voltage, ordinarily a positive voltage connected to diode 202, becomes more negative than the voltage connected to diode 203, then the voltage $e_1$ no longer represents the negative tracewidth voltage but instead the limiting value established at the wiper arm of the potentiometer 289. Thus, the negative tracewidth control input circuit has selected between two voltages. In a similar manner, but with inverted voltages, the diode 216 in association with the diode 214 and the diode 241 in association with the diode 239, selects between a voltage at the potentiometer 292 and a plus tracewidth and plus slope control voltage.

Basically, the shading function generator shown in FIG. 4 is a triangular wave generator producing either a bipolar or unipolar output. In operation, the operational amplifier 69 generates a 2.4 volt peak to peak square wave as shown at A in FIG. 5. This voltage drives the diode bridges 64 and 71. The output of the operational amplifier 69 is controlled at ±1.2 volts by the diodes 271 and 272 and the feedback resistors 274 and 279. Diodes 271 and 272 clamp the noninverting input of the amplifier 69 at ±0.6 volt with respect to ground. Resistor 274 is equal in value to resistor 279 and limits the overall gain of the operational amplifier 69 to a stable gain of two.

The diode bridges 64 and 71 act as current steering gates so arranged that when the output of the amplifier 69 is +1.2 volts, the diodes 261 and 263 of bridge 64 and diodes 275 and 277 of bridge 71 are conducting while the diodes 262, 264, 276, and 278 are nonconducting. Conduction of diode 277 of bridge 71 connects a voltage $e_3$ to the input of the operational amplifier 79 through the resistor 267. By operation of the capacitor 284, the output of the operational amplifier 79, $e_{a_1}$, is a negative going ramp the magnitude of which increases at a rate determined by:

$e_{81}=e_3/R_{267}C_{284}$ vol. /seconds where $R_{267}$ is the v... of resistor 267 and $C_{284}$ is the value of the capacitor 2... The output of the amplifier 79 continues to increase until the voltage drop across resistor 281 and potentiometer 282 is great enough to drive the input of the operational amplifier 69 negative. A negative input to the amplifier 69 causes the output voltage to flip to the −1.2 volt level. To insure that the amplifier 69 switches from a positive to a negative output or vice versa, the potentiometer 282 is adjusted so that the value of resistor 281 plus the effective resistance of the potentiometer 282 just equals the value of resistor 265. When the potentiometer 282 is so adjusted, an output signal from the amplifier 79 which is slightly larger in magnitude and of opposite polarity with respect to the voltage $e_1$ causes the input to the operational amplifier 69 to become slightly negative thereby resulting in a −1.2 output voltage.

A −1.2 volts at the output of the amplifier 69 causes the diodes 262 and 264 of the bridge 64 and diodes 276 and 278 of the bridge 71 to conduct while the diodes 261, 263, 275, and 277 are nonconducting. The circuit now operates in a manner similar to that described above with a reversal of polarity. A voltage $e_4$ is now connected to the operational amplifier 79 through the diode 278 and resistor 268. The output of the amplifier 79 now becomes a positive going ramp, the magnitude of which changes at a rate determined by:

$e_{81}=e_4/R_{268}C_{284}$ volts/seconds where $R_{268}$ is the value of resistor 268. When the magnitude of the output voltage of amplifier 79 drives the input of the amplifier 69 positive, the amplifier 69 again shifts to a −1.2 volt level. Since resistor 266 is approximately equal to resistor 265, which in turn is equal to the value of resistor 281 plus the effective value of the potentiometer 282, the output of the amplifier 79 is just slightly larger than either the voltage $e_1$ or the voltage $e_2$ when the switching action of the amplifier 69 takes place. Thus, the maximum value of the positive amplitude of the function generator at terminal 81 will always equal $e_1$ (the plus tracewidth voltage) less one diode voltage drop, and the maximum value of the negative amplitude equals $e_1$ (the negative tracewidth voltage) less one diode voltage drop.

If $R_{265}=R_{266}=2R_{267}=2R_{268}$ and $e_1=e_3=-e_2=-e_4=(e_{in}+e_{diode})=-(-e_{in}-e_{diode})$, then the peak to peak output amplitude at terminal 81 will be $\pm e_{in}$, wherein $+e_{in}$ equals the minus tracewidth and minus slope control signals and $-e_{in}$ equals the plus tracewidth and plus slope control voltages. The frequency of the wave at terminal 81 is maintained substantially constant and equal to $1/2R_{265}C_{284}$. For a 500 kHz. wave, the resistors 267 and 268 are typically 1,000 ohms each, resistors 265 and 266 are on the order of 2,000 ohms, and capacitors 284 and 286 are 500 picofarads each.

Referring to FIG. 5, there is shown at A the substantially square wave output of the operational amplifier 69 having a peak to peak amplitude of 2.4 volts. Also shown is the output wave at terminals 81 and 86 for both the bipolar and unipolar operation of the shading function generator 27.

For generating a unipolar shading function, the output of the operational amplifier 79 is coupled to a selector circuit, generating an output at terminal 86, and including transistors 82, 83, and 84, a capacitor 251, diodes 252 and 253, and resistors 254–260. This circuit simply clips the output voltage of the amplifier 79 by means of the diode 253 selecting the more negative (ground) input when the output of the amplifier 79 goes positive. In the unipolar mode of operation the relay 287 is energized thereby paralleling the capacitor 286 with the capacitor 284 in the feedback loop of the amplifier 79.

The selector circuit shown produces a negative unipolar output at the terminal 86. To generate a negative unipolar wave, voltage $e_1=e_3=-e_4=+e_{in}+e_{diode}$ and voltage $-e_2=e_{diode}$. Thus, the plus tracewidth control voltage is zero and the plus slope control voltage equals to $-e_{in}$, while $=e_{in}$ remains equals to $-e_{in}$, while $+e_{in}$ remains connected to the minus tracewidth and minus slope controls. Again, where the resistances at the diode bridges 64 and 71 are as given above, the peak output amplitude at terminal 86 is equal to $-e_{in}$ and the frequency is substantially constant and equal to $1/2R_{265}$ $(C_{284}+C_{286})$. If the capacitors 284 and 286 are equal, then the frequency in the unipolar mode is equal to the frequency of the bipolar mode.

Referring to FIG. 6, there is shown a preferred embodiment of a transistorized seismic format selector 18 including a variable area display blanking circuit 141. The format selector itself includes a wiggley trace relay 87, a variable area plus wiggle trace relay 88, a variable area relay 89, a variable density relay 91, and an intensity control relay 92. Normally open contacts of relays 87 and 92 connect directly to the analog seismic data input channel 93 and normally open contacts of the relay 91 are directly connected to the bipolar triangular wave output of the generator 27 on an input channel 94. Contacts of relays 88 and 89 are coupled to the seismic data plus baseline input channel 96, the tracewidth input channel 97, and the variable area input channel 98 through a steering circuit comprised of diodes 99, 101, 102 and 103. A transistor 104 with resistors 106, 107 and 108 provide one constant current source for the steering circuit and a transistor 109 with resistors 111, 112, and 113 provide a second constant current source. Each of the relays 87, 88, 89, and 91 has two normally open contacts interconnected to the input terminal of an operational amplifier 114. Relay 88 is coupled to the operational amplifier 114 through a trimming circuit including a potentiometer 116 and a resistor 117. Similarly, the normally open contacts of relay 89 are coupled to the amplifier 114 through a trimming circuit including a potentiometer 118 and a resistor 119 and then through a diode network including diodes 121 and 122. A trimming circuit including a potentiometer 123 and a resistor 124 couples the normally open contacts of relay 91 to the operational amplifier 114. The output of the operational amplifier 114 is the seismic trace format for the x-deflection of the CRT 42 on line 33.

In the wiggley trace mode, an instruction code appears on line 126 to energize the relay coil 128 of the relay 87. To produce a variable area plus wiggle trace format, an instruction code is transmitted on line 129 to energize the relay coil 131 of the relay 88. For the variable area format, an instruction code is transmitted on line 32 to energize the relay coil 133 of the relay 89. To produce a variable density format, an instruction code appears on line 134 to energize the relay coil 136 of the relay 91 and on line 137 to energize the relay coil 138 of the relay 92. Thus, in the variable density mode, two of the selector relays are actuated, one to produce the desired seismic format, which as explained previously, is a bipolar shading function, and the second to transmit the analog seismic data to the amplifier 38 over the line 34.

In the variable area plus wiggle trace and variable area modes, the diodes 99, 101, and 102 provide the selecting process as explained. This selection process is performed by the inherent function of diodes to be back biased or forward biased under various voltage conditions.

The CRT blanking control for the variable area format is generated in the system 141 which includes an operational amplifier 142. Analog seismic data is connected to the input of the amplifier 142 through a trimming circuit including a potentiometer 143 and a resistor 144. Also coupled to the input of the amplifier 142 is a baseline voltage through a resistor 146. A limiting circuit for the amplifier 142 includes a Zener diode 147, a resistor 148, and diodes 151 and 152. The output voltage of the amplifier 142 also connects to a second input terminal 153 through a circuit including a capacitor 154 and resistors 156, 157, and 158.

Coupled to the output of the amplifier 142 is a selection circuit including transistors 159 and 161. Transistor 159 amplifies a blanking override signal on an input channel 162. Associate circuitry for the transistor 159 includes a capacitor 163, diodes 164 and 166, and resistors 167, 168, 169 and 171. The output of the operational amplifier 142 is coupled to the transistor 161 through diodes 172 and 173 and the output of the transistor 159 is coupled to the transistor 161 through a diode 174. Transistor 161 amplifies the difference between these signals to produce a blanking signal on line 36 to be transmitted to the amplifier 44. Associate circuitry for the transistor 161 includes a capacitor 176, diodes 177 and 178, and resistors 179, 181, 182, and 183. Operation of the circuit 141 is straightforward to produce the blanking signal in the variable area format.

An alternate method of connecting the shading function generator is shown in FIG. 7 wherein the same numbers are used for components similar to those appearing in FIG. 1. With the system of FIG. 7, a uniform shading of the seismic display is produced in the several variable area modes. The path of the seismic data from a computer (not shown) includes an analog-to-digital converter 10 followed by a low-pass filter 11 in series with an impedance matching amplifier 12 and an attenuation amplifier 14. An instruction code on line 13 to the amplifier 12 and an attenuation code on input lines 16 to the amplifier 14 determines the polarity and magnitude of the analog seismic data transmitted to the summing amplifier 17 wherein a summation with baseline voltage is performed; assuming a baseline voltage exists. The baseline voltage is transmitted from a central computer through a digital-to-analog converter 19 in series with an impedance matching amplifier 21 connected to the amplifier 17. The baseline voltage from the amplifier 21 and the seismic data from the amplifier 14 are coupled to a baseline comparator in a seismic format selector 18 which is similar to that described in FIG. 1 and detailed in FIG. 6.

The output of the amplifier 17 is coupled to the seismic format selector 18 at the seismic data input channel and the seismic data plus baseline input channel, and in addition, to one contact of a single-pole, double-throw switch 301 mechanically coupled to a relay coil 302. Also coupled to the switch 301 is a tracewidth and slope control signal from an impedance matching amplifier 26 in series with a digital-to-analog converter 23 coupled to a digital computer (not shown). The output of the impedance matching amplifier 26 is also tied to the plus tracewidth limit input channel of the seismic format selector 18. With the switch 301 in the position shown, the output of the amplifier 17 is connected to an inverting amplifier 24, a plus slope control terminal of a seismic format shading function generator 27, and to one contact of a switch 303. The seismic format function generator 27 is similar to that described earlier in FIG. 1 and detailed in FIG. 4. As such, it includes a negative tracewidth control terminal and a negative slope control terminal tied to the output of the inverting amplifier 24. In addition, it includes a bipolar/unipolar control terminal receiving a code on line 28. This code also energizes the relay 302 and a relay 304 coupled to actuate the switch 303. The plus tracewidth control terminal of the function generator 27 is connected to the switch 303. The function generator 27 generates a bipolar triangular wave voltage connected to the variable density terminal of the seismic format selector 18 and a unipolar triangular wave signal connected to the variable area input terminal of the format selector. An additional feature of the format function generator 27 of FIG. 7 includes a plus and minus bounding adjustment. The plus bounding adjustment is tied to a plus slope bounding terminal and a plus tracewidth bounding terminal; the minus bounding adjustment is connected to a negative tracewidth bounding terminal and a negative slope bounding terminal. Referring to FIG. 4, the plus tracewidth bounding terminal is connected to diode 216 and the plus slope bounding terminal is tied to the diode 241. For the negative side of the system, the diode 203 controls negative tracewidth bounding and the diode 228 controls negative slope bounding. For the function generator of bounding adjustments are provided by potentiometers 289 and 291.

In an exemplary operation of the system of FIG. 7, for a negative unipolar variable area mode the plus tracewidth input is grounded and the relays 302 and 304 are energized as shown. The seismic data plus baseline signal from the amplifier 17 is connected to the plus slope control and through the inverter amplifier 24 to the minus tracewidth and minus slope control. Using the circuitry of FIG. 4, this configuration produces a unipolar triangular wave function with negative amplitude variations bounded by the negative amplitude variations of the seismic data plus baseline signal, while the frequency of the waveform remains essentially constant. By means of the selection process performed by the diodes 203, 228, and 241, the positive excursions of the seismic data plus baseline signal from the amplifier 17 are disconnected from the function generator 27. Thus, for the positive excursions a nearly zero amplitude triangular function is generated at the unipolar output of the generator 27 until the polarity of the seismic signal again goes negative. A bounded unipolar shading function is shown at line A of FIG. 8. The same half wave shading effect is achieved in this configuration as described earlier, except the shading signal appears uniform with no seismic data bounding intensification. There is no intensification effect because the beam does not dwell at the seismic data boundary during the shading cycle. Referring to line B of FIG. 8, there is shown a variable area plus wiggley trace signal generated at the output line 33 of the format selector 18 of FIG. 7.

To avoid undue complication of this description, the numerous filtering and voltage dropping components of the circuits shown in FIGS. 4, 6, and 7 have not been discussed. It is believed that these unmentioned components are self-explanatory to one skilled in the art.

While several embodiments of the invention, together with modifications thereof, have been described in detail herein and shown in the accompanying drawings, it will be evident that various further modifications are possible in the arrangement and construction of components without departing from the scope of the invention.

What is claimed is:

1. A seismic format generator for selectively producing, in response to a complete set of input instructions, an analog seismic signal in a plurality of formats for recordation and/or for display which comprises:

- means for generating a baseline control voltage for limiting said seismic signal above a preselected level, a tracewidth control voltage, unipolar and bipolar control voltages for selectively shading said seismic signal,
- a plurality of analog switches for combining said seismic signals with said control voltages, one for each of the desired combinations of the seismic signals and said control voltages,
- means for energizing each of said switches independently of each other by one of said input instructions,
- amplifying means connected to said switches for amplifying the selected combinations to produce a desired output format, and
- a diode limiting circuit coupled to said switches for selecting the voltage connected to said amplifying means through said switches in dependence on the respective magnitudes of said control voltages.

2. A seismic format generator as set forth in claim 1 including a second amplifying means for comparing the seismic signals with the baseline control voltage to generate a variable area blanking signal.

3. A seismic format generator as set forth in claim 1 wherein means in circuit with a first of said switches generates a wiggle trace format, with a second generates a variable area plus wiggle trace format, with a third generates a variable area format, and with a fourth generates a variable density format.